Aug. 31, 1954
W. C. HUEBNER
2,687,672
MOUNTING FOR REVERSING LENS
Filed March 24, 1952
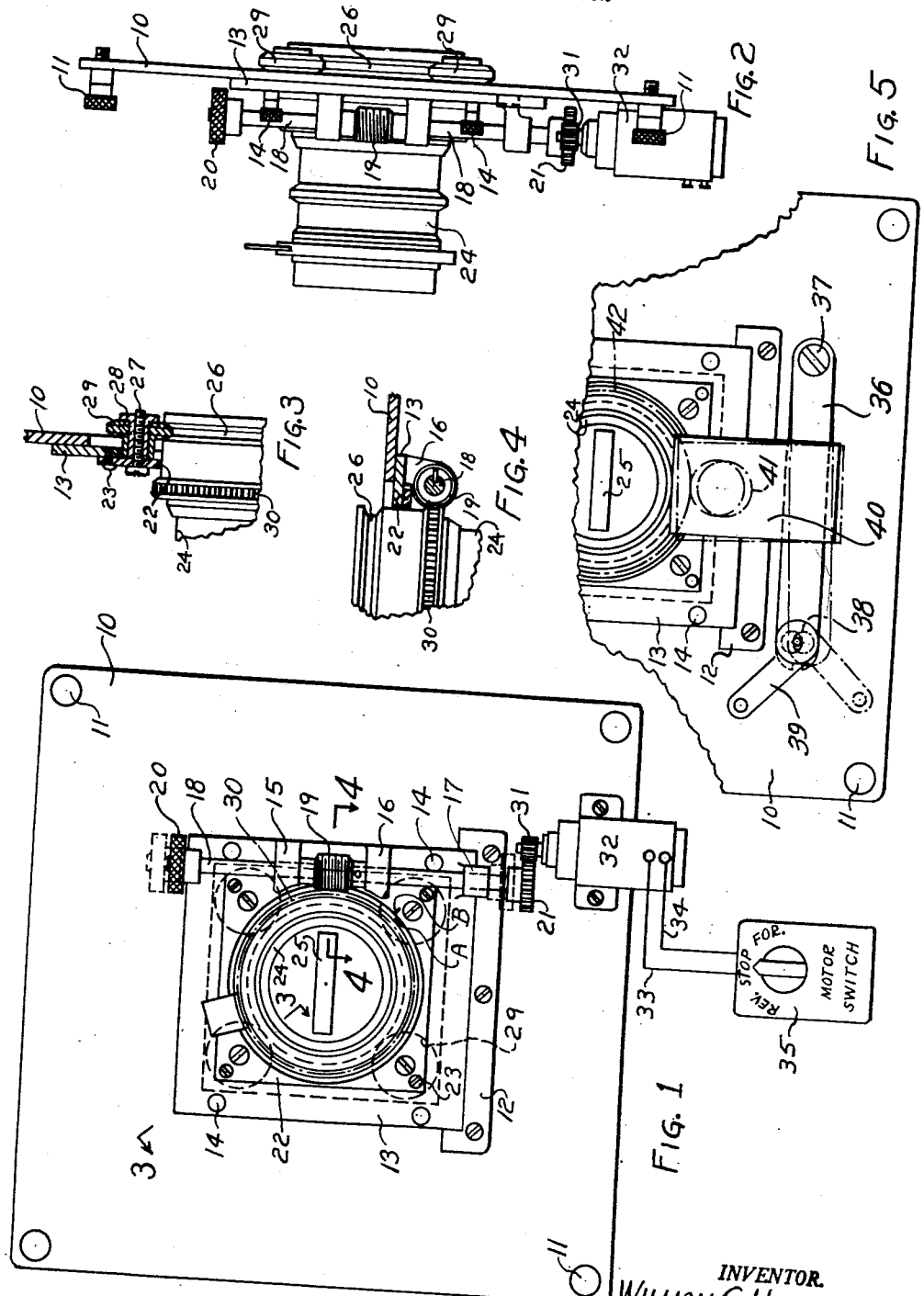
INVENTOR.
WILLIAM C. HUEBNER
BY Hudson Boughton
Williams, David & Hoffmann
ATTORNEYS Patented Aug. 31, 1954

2,687,672

UNITED STATES PATENT OFFICE 2,687,672

MOUNTING FOR REVERSING LENS

William C. Huebner, Mamaroneck, N. Y.

Application March 24, 1952, Serial No. 278,251

13 Claims. (Cl. 88—57)

This invention relates to a lens mounting and particularly to a mounting for a reversing lens as, for example, a reversing lens such as is shown in my Patent 2,408,855, issued October 8, 1946.

The reversing lens shown in said Patent 2,408,855 contains a reversing element located intermediate the nodal points between the front and back optical systems of the lens. The purpose of the reversing element is to cause the image which appears on the ground glass of a camera to be of the same order as the original as distinguished from a reversed image produced on the ground glass by an ordinary lens.

When an image is focused on a ground glass of a camera using an ordinary lens and viewed from the front the image is inverted, that is letters constituting the image will read backwards from right to left. On the other hand, if the same image is projected through the reversing lens of said Patent 2,408,855 the image produced on the face of the ground glass or negative will be of the same order as the original and each letter will read from left to right.

In reproduction work for direct printing or for any purpose where the image, such as texts, must be viewed and read from left to right, the reversing lens of the patent is an important and essential element in the art of reproduction in that it saves expensive methods and time delays in stripping or otherwise reversing the image produced by an ordinary lens.

An object of the invention is to provide an improved and novel mounting for a reversing lens of the character referred to and containing provision for accurately adjustably rotating the lens on its axis.

A further object is to provide a mounting for a reversing lens which enables the lens to be rotatably adjusted on its axis to cause the reversing element of the lens to position the image in various desired ways and locations on the ground glass or negative as, for instance, the image may be produced in upright position, moved or inclined to the right, left or downwardly, or positioned at any angle in between the positions referred to.

A further object is to provide a mounting for a reversing lens which enables the images to be positioned on the ground glass of a camera to fit more properly with lay-outs or reproduction work, inasmuch as the adjustable rotation of the lens barrel lines up the image in registry with predetermined lines and positions on the ground glass irrespective of the way in which the image may be lined up on the copy board or how the image is projected through the lens reversing element.

Still another and important object is to provied a mounting for a reversing lens which enables the operator to select and control the position of the final image on the ground glass of the camera.

Another object is to provide a mounting for a reversing lens which is of such character that, if desired, the reversing lens can be quickly removed from the lens board of a camera and an ordinary non-reversing lens mounted thereon and vice versa.

Another object is to provide a mounting for a reversing lens wherein the lens may be rotatably adjusted either manually or by power and in the latter case the adjustment can be effected from the dark room of the camera, thus saving substantial time and effort on the part of the operator who does not have to leave the dark room to manipulate the lens.

Another object is to provide a mounting for a reversing lens which is so constructed that various size lenses of different focal lengths may be interchangeably employed, thus increasing the utility of the camera upon which the lens mounting is used.

Further and additional objects and advantages not hereinbefore specified will become apparent hereinafter during the detailed description of embodiments of the invention which is to follow.

Embodiments of the invention are illustrated in the accompanying drawing wherein, Fig. 1 is a front elevational view of a lens board adapter plate having thereon a lens mounting embodying the invention, said view showing the electric circuit and control switch for the motor for rotatably adjusting the lens, it being understood that said switch may be mounted either on the lens board adapter plate or remotely with respect thereto as for instance in the dark room of the camera.

Fig. 2 is a side elevation of the lens mounting shown in Fig. 1.

Fig. 3 is a fragmentary sectional view taken substantially on line 3—3 of Fig. 1 looking in the direction of the arrows.

Fig. 4 is a fragmentary sectional view taken substantially on line 4—4 of Fig. 1 looking in the direction of the arrows, and Fig. 5 is a fragmentary front elevational view similar to Fig. 1 but showing a different arrangement for rotating the lens barrel.

The mounting comprises the lens board adapter plate 10 which at its four corners is provided with suitable means such as the knurled finger screws 11 for attaching the lens board adapter plate 10 to the lens board proper of the camera. The lens board adapter plate 10 has secured to it in a predetermined position thereon a rest bar 12 which supports the lens adapter plate 13 while it is being secured to the lens board adapter plate 10.

The lens adapter plate 13 has adjacent to its four corners suitable means for removably securing the lens adapter plate to the lens board adapter plate as, for instance, the knurled finger screws 14. The lens adapter plate 13 adjacent one side edge thereof has vertically spaced (as viewed in the drawing) bearing brackets 15 and 16. The lens adapter plate 13 also is provided at its edge adjacent to the rest bar 12 with a bearing bracket 17. The bearing brackets 15, 16 and 17 are provided with aligned bearing openings in which a shaft 18 is rotatable and is free to have axial movement therein. A worm 19 is splined on the shaft 18 intermediate the bearing brackets 15 and 16 so that said worm rotates with the shaft 18 but the latter is free to move axially relative to the worm.

The upper end of the shaft 18, as viewed in the drawing, is provided with an operating knob 20 while the lower end of said shaft has fixed thereto a gear 21. The purpose of the shaft 18 and gear 21 will be referred to hereinafter.

A lens roller support plate 22 is removably secured to the lens adapter plate 13 by means of suitable securing screws 23 located adjacent to the corners of the lens roller support plate. The lens board adapter plate 10, the lens adapter plate 13 and the lens roller support plate 22 are provided with central registering openings with the opening in the lens board adapter plate 10 being larger than the openings in the lens adapter plate 13 and the lens roller support plate 22.

The lens barrel 24 which houses the optical elements of the lens including the reversing element 25 is mounted in the registering openings of the plates 10, 13 and 22 and interfits the openings in the plates 13 and 22. The lens barrel 24 adjacent its end which extends through the opening in the plate 10 is provided with an annular groove 26, see Figs. 2 and 3.

The lens roller support plate 22 mounts adjacent its four corners and on screws 27 headed bushings 28 upon which rollers 29 are rotatably supported, the rollers 29 being located adjacent the heads of the bushings 28 and having sleeve portions extending to the plate 22. It will be observed that there are four bushings 28 and four rollers 29 and that the same extend through four spaced openings in the plate 13 and through the large central opening in the plate 10 with the rollers engaging in the annular groove 26 of the lens barrel and rotatably supporting the lens barrel in position in the openings in the plates 10, 13 and 22. The cross sectional contours of the groove 26 and the rollers 29 are such that the lens barrel will be steadily supported in position.

The lens barrel 24 forwardly of the lens roller support plate 22 has mounted thereon a worm wheel 30 which when the lens is in position on the plates meshes with the worm 19. It will be seen that rotation of the shaft 18 will effect rotation of the worm 19, worm wheel 30 and lens barrel 24. The shaft 18 can be moved axially to its dash line position of Fig. 1 when it is desired to rotate the lens barrel manually by the knob 20. When the shaft 18 is in its full line position of Fig. 1 the gear 21 fixed on its lower end is in mesh with the drive pinion 31 of a small gear head motor 32 secured in position on the lens board adapter plate 10. The motor 32 is a reversible motor and is connected for its power supply to electrical leads 33 and 34 extending to a suitable control switch 35, the construction of which may take any well known form and hence need not be illustrated. The control knob of the control switch 35 will have an intermediate "off" or stop position with a "reverse" position to one side of the stop position and a "forward" position to the other side thereof as will be well understood, and an electrical supply circuit will be suitably connected to the switch 35. The switch 35 could be mounted directly on the lens board adapter plate 10 if desired, but preferably it will be located remotely with respect to the lens mounting as, for instance, in the dark room of the camera.

The lens barrel 24 on its forward end may be provided with a suitable indicating line or lines A while the lens roller support plate 22 may be similarly provided as indicated at B. When the operator is adjusting the reversing lens manually about its focal axis to a known position he can determine such position by reference to the lines A and B. In so adjusting the lens manually it will be recalled that the operator moves the knob 20 and shaft 18 axially upwardly to the dash line position of Fig. 1 to move the gear 21 out of mesh with the pinion 31 and into its dash line position. Then rotation of the knob in one or the other direction will effect the desired rotation of the lens barrel until it has been moved to the position desired.

When the operator wishes to rotate the lens barrel on its focal axis by means of the motor 32, then the knob 20, shaft 18 and gear 21 will be in the full line position of Fig. 1 with the gear 21 in mesh with the pinion 31. Consequently when forward or reverse energization of the motor 32 is effected by the switch 35 the lens barrel will be rotated in the desired direction.

If the operator is effecting the rotation of the lens barrel by the motor 32 from a remote location where the switch 35 is positioned as, for instance, the dark room of the camera, he can align the position of the image on the ground glass or on a lay-out in the camera in the exact position it should be in and in so doing he does not have to leave the dark room.

It may be desirable at various times to employ the usual non-reversing lens on the camera and this can be quickly accomplished with the present mounting. The lens barrel of the usual non-reversing lens may have secured thereon a lens adapter plate similar to the lens adapter plate 13 previously described but which adapter plate extends to the lens barrel, that is, the opening in the lens adapter plate directly receives the lens barrel and the lens roller support plate is omitted.

It will be apparent that the barrel of the non-reversing lens and the lens adapter plate secured thereto can be secured to the lens board adapter plate 10 by means of suitable finger screws carried by the lens adapter plate and functioning as do the screws 14 previously described. Thus it will be seen that if it is desired to employ an ordinary process lens, i. e., a non-reversing lens, then the reversing lens barrel 24, the lens roller support plate 22 and the lens adapter plate 13 may be removed from the lens board adapter plate 10 and the barrel of the non-reversing lens mounted in the opening and secured to a substitute lens adapter plate can be secured directly to the lens board adapter plate 10, inasmuch as no rotation is to be imparted to the lens barrel and hence the lens roller support plate is not required.

In Fig. 5 a modified arrangement is illustrated for rotating the lens barrel. A lever 36 is pivoted at 37 on the lens board adapter plate 10 below the rest bar 12. The lens board adapter plate 10 rockably mounts a shaft having an eccentric cam 38 located in an opening formed in the free end of the pivoted lever 36 with the shaft carrying the cam having secured thereto an operating handle 39. The lever 36 has fixed to it an electric motor indicated at 40 and the spindle of said motor is provided with a gear 41 adapted to be meshed with a gear 42 formed on the barrel of the lens. The gears 41 and 42 may be compared to the worm 19 and gear 30 of the previously described construction but preferably the gears 41 and 42 will be spur gears.

It will be seen that the lever 36 can be rocked to its full line position by the operating handle 39 and cam 38 to bring the gear 41 of the motor into mesh with the gear 42 on the lens barrel.

It will also be seen that when the lever 36 is thus rocked to intermesh the gears 41 and 42 that the cam 38 maintains the gears in mesh and the lever 36 and motor 40 in the full line position of Fig. 5.

When it is desired to disengage the gear 41 from the gear 42 the lever 36 can be moved to the dash line position of Fig. 5 by rotating the handle 39 and cam 38 to their dash line position.

It will be understood that the motor 40 will be connected to a suitable source of electrical energy and that the control switch for the motor may be located adjacent to the motor or remotely with respect thereto as in the previously described form.

Although preferred embodiments of the invention have been illustrated and described herein it will be understood that the invention is susceptible of various modifications and adaptations within the scope of the appended claims.

Having thus described my invention, I claim:

1. A mounting for a reversing lens comprising a lens board adapter plate provided with means for detachably securing it to the lens board of a camera and having an opening, a lens adapter plate provided with means detachably securing it to one side of said lens board adapter plate and provided with an opening aligning concentrically with the opening in the latter, a reversing lens barrel mounted in and extending through said openings, means carried by said lens adapter plate and extending through the opening in the lens board adapter plate to the other side of the latter and cooperating with means on said barrel for supporting said barrel for rotation about the axis of said openings, and cooperating means for rotating said barrel and including an element on said barrel outwardly of said one side of said lens board adapter plate and elements on said lens board adapter plate operatively connected with said barrel element.

2. A mounting for a reversing lens as defined in claim 1 and wherein said lens board adapter plate is provided below said opening with a locating bar engaged by said lens adapter plate.

3. A mounting for a reversing lens as defined in claim 1 and wherein said cooperating means on said barrel and said lens board adapter plate for rotating said barrel further comprises a gear on said barrel, and a gear rotatably mounted on said lens adapter plate and meshing with the gear on said barrel.

4. A mounting for a reversing lens as defined in claim 1 and wherein said cooperating means on said barrel and said lens board adapter plate for rotating said barrel further comprises a worm wheel on said barrel, a shaft rotatable and axially movable on said lens adapter plate, a worm splined to said shaft for rotation therewith and axial movement relative thereto and meshing with said worm wheel, means for rotating said shaft manually, and a gear fixed to said shaft, in combination with power operated means mounted on said lens board adapter plate and including a drive shaft having fixed thereto a gear adapted to mesh with the gear fixed on said first mentioned shaft when the latter is at one extreme of its axial movement, and means for controlling said power means located remotely with respect to said mounting for the reversing lens.

5. A mounting for a reversing lens as defined in claim 4 and wherein said power means comprises a reversible small gear head electric motor having a driving pinion adapted to mesh with the gear fixed on the shaft that is rotatable and axially movable on said lens adapter plate while said means for controlling the power means comprises an electric circuit having therein a control switch for starting and stopping and reversing the direction of operation of said motor and located remotely with respect to said motor.

6. A mounting for a reversing lens comprising a lens board adapter plate provided with means for detachably securing it to the lens board of a camera and having an opening, a lens adapter plate provided with means detachably securing it to one side of said lens board adapter plate and provided with an opening concentrically aligning with the opening in the latter, a lens roller support plate detachably secured to said lens adapter plate and provided with an opening concentrically aligning with the previously named openings, a reversing lens barrel mounted in and extending through said openings and provided with a peripheral groove located adjacent to but outwardly of the other side of said lens board adapter plate, a plurality of circularly spaced rollers carried by said lens roller support plate and extending through the opening in said lens board adapter plate to the other side of the latter and engaging in said peripheral groove of said lens barrel for supporting said barrel for rotation about the axis of said openings, and cooperating means in part on said barrel and in part supported by said lens board adapter plate for rotating said barrel.

7. A mounting for a reversing lens as defined in claim 6 and wherein said lens board adapter plate is provided below said opening with a locating bar engaged by said lens adapter plate.

8. A mounting for a reversing lens as defined in claim 6 and wherein the cooperating means for rotating said barrel comprises a gear on said barrel and a gear rotatable on said lens adapter plate and meshing with the gear on said barrel.

9. A mounting for a reversing lens as defined in claim 6 and wherein said cooperating means for rotating said barrel comprises a worm wheel on said barrel, a shaft rotatable and axially movable on said lens adapter plate, a worm splined on said shaft and meshing with said worm wheel, and means on said shaft for manually rotating the same, a gear fixed to said shaft, power means on said lens board adapter plate including a drive shaft having a gear fixed thereto and adapted to mesh with said gear fixed on said first mentioned shaft when the latter is at one limit of its axial movement, and means for controlling said power means located remotely with respect to said lens board adapter plate.

10. A mounting for a reversing lens as defined in claim 9 and wherein said power means comprises a reversible small gear head electric motor having a drive shaft and a pinion fixed thereon and adapted to mesh with the gear fixed on said rotatable and axially movable shaft while said control means for said power means comprises an electric circuit for energizing and controlling said motor, and a switch in said circuit for starting, stopping and controlling the direction of energization of said motor and located remotely with respect to said motor.

11. A mounting for a reversing lens comprising a lens board adapter plate provided with means for detachably securing it to the lens board of a camera and having an opening, a lens adapter plate provided with means detachably securing it to one side of said lens board adapter plate and provided with an opening aligning concentrically with the opening in the latter, a reversing lens barrel mounted in and extending through said openings, means carried by said lens adapter plate and extending through the opening in said lens board adapter plate to the other side of the latter and cooperating with means on said barrel located beyond said other side of said lens board adapter plate for supporting said barrel for rotation about the axis of said openings, and cooperating means for rotating said barrel and including a gear on said barrel, a lever pivoted on said lens board adapter plate and supporting a motor having a gear on its spindle adapted to be brought into and out of mesh with the gear on said barrel, and cam means carried by said lens board adapter plate and cooperating with said lever for moving the same and said motor to move said gear on the motor spindle into and out of mesh with the gear on the barrel.

12. A mounting for a reversing lens comprising a lens board adapter plate provided with means for detachably securing it to the lens board of a camera and having an opening, a lens adapter plate provided with means detachably securing it to one side of said lens board adapter plate and provided with an opening concentrically aligning with the opening in the latter, a lens roller support plate detachably secured to said lens adapter plate and provided with an opening concentrically aligning with the previously named openings, a reversing lens barrel mounted in and extending through said openings and provided with a peripheral groove located beyond the other side of said lens board adapter plate, a plurality of circularly spaced rollers carried by said lens roller support plate and located beyond the other side of said lens board adapter plate and engaging in said peripheral groove of said lens barrel for supporting said barrel for rotation about the axis of said openings, and cooperating means for rotating said barrel and including a lever pivoted on said lens board adapter plate, a motor secured to said lever and having a gear mounted on the motor spindle, a gear on said lens barrel, and cam means carried by said lens board adapter plate and cooperating with said lever to move the latter to move said motor in one direction to intermesh the gear on the motor spindle with the gear on the lens barrel and to move said motor in a second direction to disconnect said gears.

13. A mounting for a reversing lens comprising a lens board adapter plate provided with means for detachably securing it to the lens board of a camera and having an opening, a lens adapter plate provided with means detachably securing it to one side of said lens board adapter plate and provided with an opening concentrically aligned with the opening in the latter but of less diameter than said opening in said lens board adapter plate, said lens adapter plate radially outwardly of the opening therein being provided with a plurality of circularly spaced openings communicating with the opening in the lens board adapter plate, a lens roller support plate detachably secured to said lens adapter plate and provided with an opening concentrically aligning with the concentrically aligned openings in said lens board adapter plate and said lens adapter plate, a reversing lens barrel mounted in and extending through said concentrically aligned openings in said plates and provided with a peripheral groove located beyond the other side of said lens board adapter plate, roller supports carried by said roller support plate and extending through the circularly spaced openings in said lens adapter plate and through the opening in said lens board adapter plate to the other side of the latter, rollers mounted on said roller supports and engaging in said peripheral groove of said lens barrel for supporting said barrel for rotation about the axis of said concentrically aligned openings, and means for rotating said barrel and including a driven element on said barrel beyond said one side of said lens board adapter plate, and driving elements cooperating with said driven element and supported by said lens board adapter plate.

References Cited in the file of this patent

UNITED STATES PATENTS

| Number | Name | Date |
| --- | --- | --- |
| 2,130,570 | Gilmore | Nov. 22, 1938 |
| 2,257,551 | Griffin et al. | Sept. 30, 1941 |
| 2,280,989 | Welch | Apr. 28, 1942 |
| 2,282,656 | Huebner | May 12, 1942 |
| 2,377,476 | Berglund | June 5, 1945 |
| 2,408,855 | Huebner | Oct. 8, 1946 |
| 2,434,378 | Wekeman | Jan. 13, 1948 |
| 2,442,564 | Heyer | June 1, 1948 |
| 2,470,277 | Wekeman | May 17, 1949 |